United States Patent
Jain

(10) Patent No.: US 10,826,963 B2
(45) Date of Patent: Nov. 3, 2020

(54) REDUCING LATENCY FOR STREAMING VIDEO

(71) Applicant: Echostar Technologies L.L.C., Englewood, CO (US)

(72) Inventor: Vikal Kumar Jain, Foster City, CA (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/859,484

(22) Filed: Dec. 30, 2017

(65) Prior Publication Data

US 2018/0213015 A1   Jul. 26, 2018

Related U.S. Application Data

(60) Provisional application No. 62/441,246, filed on Dec. 31, 2016.

(51) Int. Cl.
*H04L 29/06* (2006.01)
*H04N 21/2387* (2011.01)
(Continued)

(52) U.S. Cl.
CPC ............ *H04L 65/607* (2013.01); *G06F 3/048* (2013.01); *H04L 65/4084* (2013.01); *H04L 65/602* (2013.01); *H04L 65/80* (2013.01); *H04N 21/234* (2013.01); *H04N 21/2387* (2013.01); *H04N 21/23439* (2013.01); *H04N 21/2402* (2013.01); *H04N 21/4331* (2013.01);
(Continued)

(58) Field of Classification Search
None
See application file for complete search history.

(56) References Cited

U.S. PATENT DOCUMENTS 10,250,894 B1 * 4/2019 Fernandes .......... H04N 21/2405
2003/0126599 A1 * 7/2003 Novak ................. G11B 27/105
725/32

(Continued)

FOREIGN PATENT DOCUMENTS

EP   2624577 A1   8/2013

OTHER PUBLICATIONS

International Searching Authority, International Search Report and Written Opinion for Patent International Application PCT/US2017/068796, dated Jul. 9, 2018.

*Primary Examiner* — Jason K Lin

(74) *Attorney, Agent, or Firm* — Lorenz & Kopf LLP

(57) ABSTRACT

Before receiving an instruction from a media player to encode a media program, a placeshifting device or other video encoder pre-encodes at least a portion of the media program to a low-bandwidth format that can be readily transmitted to the media player upon request. When the media player does instruct the placeshifting device to encode the media program, the placeshifting device initially provides the pre-encoded portion of the media program to thereby allow the media player to begin immediate playback of the pre-encoded portion. After providing the preencoded portion of the media program, the placeshifting device live encodes the remaining portions of the media program according to then-current network conditions to thereby provide the placeshifted video stream to the media player.

12 Claims, 3 Drawing Sheets

(51) Int. Cl.
*H04N 21/234*     (2011.01)
*G06F 3/048*      (2013.01)
*H04N 21/4402*    (2011.01)
*H04N 21/2343*    (2011.01)
*H04N 21/433*     (2011.01)
*H04N 21/442*     (2011.01)
*H04N 21/24*      (2011.01)
H04N 21/4147      (2011.01)

(52) U.S. Cl.
CPC . *H04N 21/44029* (2013.01); *H04N 21/44227* (2013.01); *H04L 65/608* (2013.01); *H04N 21/4147* (2013.01)

(56) References Cited

U.S. PATENT DOCUMENTS

| | | | |
|---|---|---|---|
| 2004/0045020 A1* | 3/2004 | Witt | H04N 7/163 725/13 |
| 2007/0201500 A1* | 8/2007 | Deshpande | H04L 47/10 370/412 |
| 2012/0311103 A1* | 12/2012 | Kunigita | H04N 5/76 709/219 |
| 2013/0067036 A1 | 3/2013 | Nooney et al. | |
| 2015/0304714 A1* | 10/2015 | Park | G06F 3/0488 725/88 |
| 2017/0127101 A1* | 5/2017 | Rasool | H04N 21/6125 |
| 2017/0242496 A1 | 9/2017 | Eyler et al. | |
| 2017/0264968 A1* | 9/2017 | Mao | H04N 19/40 |
| 2017/0288865 A1* | 10/2017 | Amidei | H04L 65/4092 |
| 2017/0359609 A1* | 12/2017 | Schmidt | H04N 21/2662 |
| 2017/0359626 A1 | 12/2017 | Chen et al. | |

\* cited by examiner

REDUCING LATENCY FOR STREAMING VIDEO

PRIORITY CLAIM

This application claims priority to U.S. Provisional Patent Application Ser. No. 62/441,246 filed on Dec. 31, 2017. That application is incorporated herein by reference.

TECHNICAL FIELD

The following discussion generally relates to placeshifted media streaming, and more particularly relates to systems, devices and methods for reducing latency while during placeshifting of live encoded video content.

BACKGROUND

Recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

Typically, placeshifted media streams are encoded in real time "on the fly" to adapt to then-current network bandwidth, processing resources, and the like. Generally speaking, the placeshifted stream is encoded in real-time (or near real time) at the best possible quality that can be transmitted over the then-current network conditions for presentation to the viewer without stalling during playback.

One drawback of real-time encoding, however, is that some latency is inherent, especially when the video is first started or restarted after a "skip", "seek" or other trick play operation. Generally speaking, it is desired that users have the same experiences with placeshifted content that they would have with other media viewing experiences (e.g., watching television at home, or viewing a VOD stream). In practice, however, this is difficult to achieve. The realities of live video encoding, network communications and other factors can often make starting up and/or skipping around in the video stream much more difficult. This is because it can take some time after the user commands the change in the video stream to encode the content from the new start point, to transfer the newly-encoded content to the player over the network, and to buffer enough newly-encoded video at the player to support reliable playback.

It is therefore desirable to create systems and methods to efficiently and effectively provide placeshifted video content to a remote media player. These and other desirable features and characteristics will become apparent from the subsequent detailed description and the appended claims, taken in conjunction with the accompanying drawings and this background section.

BRIEF SUMMARY

Various embodiments relate to systems, devices and automated processes to reduce latency in placeshifted media streams through the use of pre-encoded video. Before receiving an instruction from a media player to encode a media program, a placeshifting device or other video encoder pre-encodes at least a portion of the media program to a low-bandwidth format that can be readily transmitted to the media player upon request. When the media player does instruct the placeshifting device to encode the media program, the placeshifting device initially provides the pre-encoded portion of the media program to thereby allow the media player to begin immediate playback of the pre-encoded portion, which typically represents a few seconds or so of content. After providing the pre-encoded portion of the media program, the placeshifting device live encodes the remaining portions of the media program according to then-current network conditions to thereby provide the placeshifted video stream to the media player.

In one example embodiment, an automated process performed by a video encoder device provides a placeshifted video stream to a media player via a network. The process suitably comprises receiving a media program by the video encoder device before receiving an instruction from the media player via the network to encode the media program, the video encoder device pre-encoding at least a portion of the media program to a placeshifting format; in response to the video encoder device receiving the instruction from the media player to encode the media program, the video encoder device initially providing the pre-encoded portion of the media program to the media player to thereby allow the media player to begin immediate playback of the pre-encoded portion; and after providing the pre-encoded portion of the media program in response to the instruction, the video encoder device live encoding remaining portions of the media program according to then-current network conditions to thereby provide the placeshifted video stream to the media player.

In another example embodiment, a media encoder device is provided. The media encoder device suitably comprises: a television receiver interface configured to receive broadcasts of television programming; a network interface to a digital network; a digital storage configured to record and store at least some of the television programming received via the television receiver interface in a storage format; and a processor. The processor is appropriately configured to execute instructions to perform an automated process; the instructions may be stored in a digital memory and executed by the processor as desired. In one example, the processor is configured: prior to receiving an instruction from a remote media player to encode at least some of the television programming for placeshifting, to automatically pre-encode portions of at least some of the television programming stored on the digital storage in a placeshifting format that is different from the storage format; initially providing the pre-encoded portion of the media program to the media player to thereby allow the media player to begin immediate playback of the pre-encoded portion; and after providing the pre-encoded portion of the media program to the media player device, responding to the instruction by live encoding the remaining portions of the media program according to then-current conditions of the digital network to thereby provide the placeshifted video stream to the remotely-located media player via the digital network.

Other embodiments relate to media player devices that include a processor, memory and interfaces to receive network communications and to present imagery via a display to a viewer, and to processes performed by such devices. Typically, such processes are implemented using computer-executable instructions that are stored in memory or other storage and executed by a processor of the media device.

Additional details about these and other example embodiments are provided herein.

BRIEF DESCRIPTION OF THE DRAWING FIGURES

Various example embodiments will hereinafter be described in conjunction with the following drawing figures, wherein like numerals denote like elements, and FIG. 1 is a block diagram of an example media encoding system;

DETAILED DESCRIPTION

Figure 1:
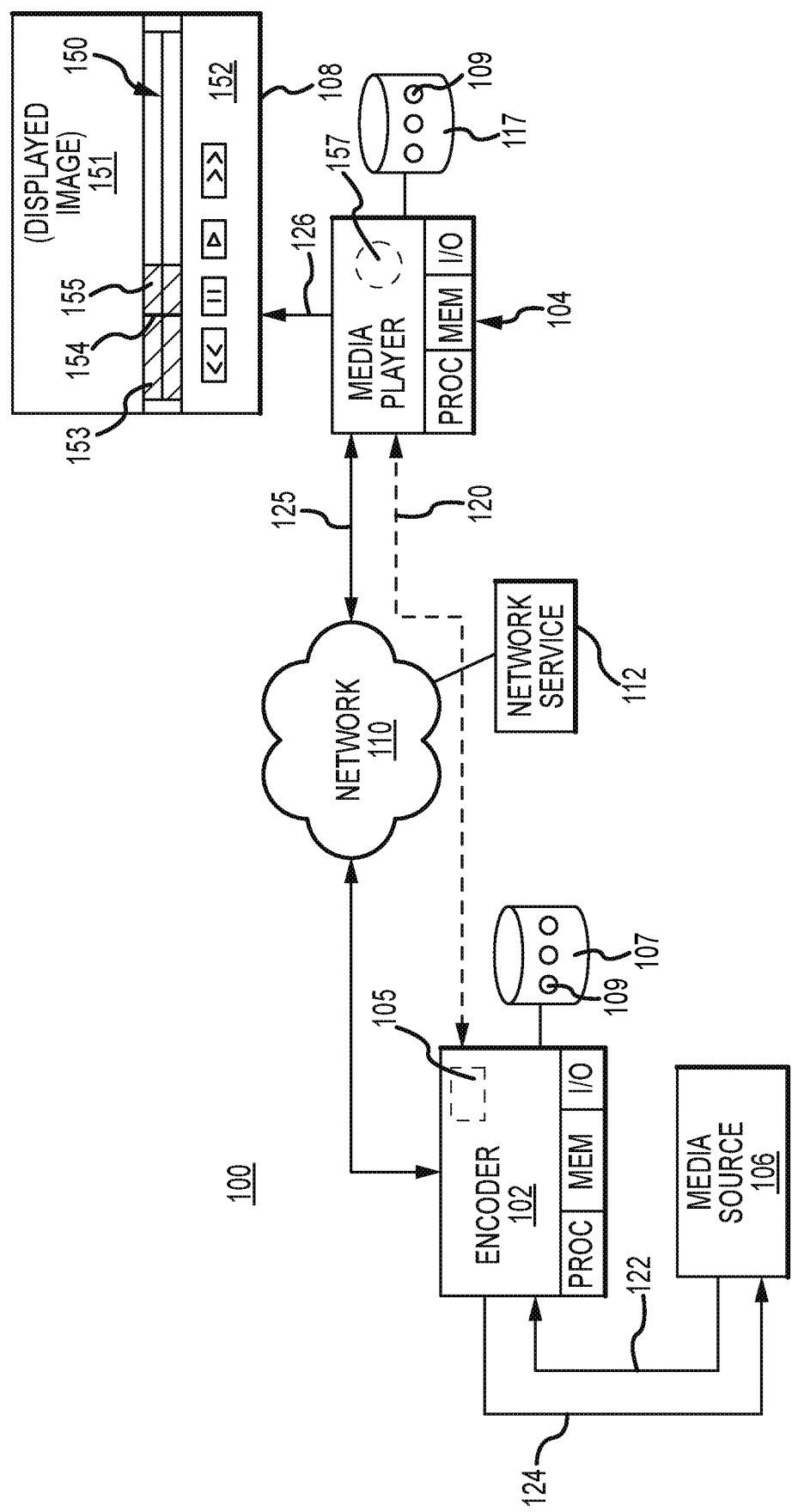

The following detailed description of the invention is merely exemplary in nature and is not intended to limit the invention or the application and uses of the invention. Furthermore, there is no intention to be bound by any theory presented in the preceding background or the following detailed description.

Real-time video encoding used in the placeshifting setting can be enhanced with pre-encoded video to reduce latency. According to various embodiments, the placeshifting device pre-encodes at least a portion of the media program prior to placeshifting so that the expected start points (e.g., the beginning of the program) can be immediately (or at least very quickly) provided to the media player without real-time encoding. While the viewer is watching the first few seconds of the media program from the pre-encoded content, the placeshifting device can live encode the remainder of the stream in real-time (or even faster than real time) so that the video quality can be improved and the adaptive benefits of traditional placeshifting can be enjoyed through the remainder of the stream.

The amount of content that will be pre-encoded will vary from embodiment to embodiment according to the amount of content, the amount of storage that is available, the amount of time that is available to perform the pre-encoding and/or any number of other factors. If the source program is recorded on a DVR or is otherwise readily available in its entirety, for example, then there may be sufficient time and data storage to pre-encode the entire program (or at least substantial portions of the program) in the fast start format so that any seeking or trick play within the program can be met with fast start content at the newly-commanded start point. If the source program is a live broadcast (e.g., a sports program), however, there may not be sufficient cached source content to pre-encode more than a few seconds or so without creating additional delay for the viewer. Even with live broadcasts, however, it may be possible to quickly pre-encode a few seconds of startup content without creating substantial lag between the live broadcast and the place-shifted stream.

Various embodiments can pre-encode startup content at expected start points in the video content. Such start points may include the beginning of the program, the first few seconds after the viewer previously paused or switched away from the program, or the like.

Pre-encoded content may be delivered to the media player in any manner. In various embodiments, pre-encoded portions are only available for the start point of the video, and/or the resume point of a previously-watched/paused video. In other embodiments wherein multiple pre-encoded portions are available, however, all of the pre-encoded portions could be transferred to the media player as soon as possible (as determined by factors such as storage, processing capabilities and bandwidth) during the streaming session. If the user were to skip to a different point in the video that has been pre-encoded, then the player could immediately begin playback of the cached pre-encoded content while the remote encoder catches up with live encoding. The pre-encoded content may be delivered out-of-band, if desired. Various embodiments could pre-cache the pre-encoded contents of certain programs on the player even before streaming begins if sufficient time, bandwidth and storage are available.

A "few seconds" of pre-encoded content as used herein is intended to convey that the specific amount of pre-encoded content is not universal, and may vary from embodiment to embodiment. Ideally, the "few seconds" of content represents sufficient lead time to allow the encoder to produce and deliver live-encoded content without substantial lag to the viewer. In one implementation, this lag time may be on the order of about three to five seconds, although that time may change with evolutions in encoder speed, network bandwidth, program delivery and other technologies. Other embodiments may use any other duration, as desired.

Different embodiments may produce different amounts of pre-encoded content to support placeshifting to different types of devices or over different types of networks, as appropriate. Streaming to a personal computer via a LAN, for example, may incur less transmit time lag than streaming to a mobile phone over a mobile network. While encoder delay for both of these scenarios will typically be consistent, the additional delays may nevertheless dictate different amounts of preencoded data in some embodiments.

Turning now to the drawing figures and with initial reference to FIG. 1, an example placeshifting system 100 suitably includes a placeshifting encoder system 102 that receives media content 122 from a DVR or other content source 106 and pre-encodes at least some of the received content 122 prior to streaming over network 110. The pre-encoded content 109 may be stored in a data storage 107 until placeshifting begins, as desired. When the media player 104 requests a stream of the received content 122, the placeshifting device 102 initially retrieves the preencoded content 109 from storage 107 and delivers the pre-encoded content 109 to support fast startup by media player 104. Placeshifting device 102 then begins live encoding the content 122, as would be expected in traditional placeshifting. The live encoded content can then be transmitted as the encoded media stream 120 to a media player 104 over network 110 while the placeshifting device 102 continues to live encode additional content.

The media player 104 initially receives the pre-encoded content 109, which can be rendered for immediate playback on display 108 until the player 104 receives the live-encoded stream 120 via network 110. In various embodiments, a server 112 may also be provided to communicate with encoder system 102 and/or player 104 via network 110 for assisting these devices in locating each other, maintaining security, providing or receiving content or information, and/or performing any other features. This feature is not required in all embodiments, however, and the concepts described herein may be deployed in any data streaming application or environment, including placeshifting but also any other media or other data streaming situations as desired.

Placeshifting encoder system 102 is any component, hardware, software logic and/or the like capable of transmitting a packetized stream of media content over network 110. In various embodiments, placeshifting device 102 is a set top box (STB) or other integrated device with television receiver, DVR and/or other content sources 106 built in. Placeshifting device 102 incorporates suitable encoder and/or transcoder (collectively "encoder") logic to convert audio/video or other media data 122 into a packetized format that can be transmitted over network 110. The media data 122 may be received in any format, and may be received from any internal or external source 106 such as any sort of broadcast, cable or satellite television programming source, a "video-on-demand" or similar source, a digital video disk (DVD) or other removable media, a video camera, a video-on-demand (VOD) stream, and/or the like. Encoder system 102 encodes media data 122 to create media stream 120 in any manner. As noted above, some or all of the available program content may be pre-encoded 109 and stored in storage 107 prior to placeshifting. These pre-encoded contents 109 can be immediately delivered to the media player 104 for fast start up, as described in more detail herein.

In various embodiments, encoder system 102 contains a transmit buffer 105 that temporarily stores live encoded data prior to transmission on network 110. As buffer 105 fills or empties, one or more parameters of the live encoding may be adjusted to maintain desirable picture quality and data throughput in view of the then-current network performance. Changes in the network transfer rate may be identified from, for example, changes in the utilization of the outgoing buffer 105. Other embodiments may additionally or alternatively consider feedback from the remote media player 104, or any other data as appropriate. As noted herein, one or more parameters such as bit rate, frame rate, resolution, etc. of the live encoded stream 120 may be set so that the content is delivered to the remote media player 104 at an appropriate quality level so that video quality is as good as possible in view of then-current network conditions.

Several examples of placeshifting systems 102 may be implemented using any of the various HOPPER® or SLINGBOX® products available from Dish Network of Englewood, Colo., although other products could be used in other embodiments. Many different types of encoder systems 102 are generally capable of receiving media content 122 from an external source 106 such as any sort of digital video recorder (DVR), set top box (STB), cable or satellite programming source, DVD player, and/or the like. In such embodiments, encoder system 102 may additionally provide commands 124 to the source 106 to produce desired signals 122. Such commands 124 may be provided over any sort of wired or wireless interface, such as an infrared or other wireless transmitter that emulates remote control commands receivable by the source 106.

In other embodiments, encoder system 102 may be integrated with any sort of content receiving or other capabilities typically affiliated with source 106. Encoder system 102 may be a hybrid STB, receiver, media player, DVR, game console or other device, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed, stored in DVR or other storage, and/or place shifted to a remote player 104 as appropriate. Such devices 102 may also include a content database stored on a hard disk drive, memory, or other storage medium to support a personal or digital video recorder (DVR) feature or other content library as appropriate. Hence, in many embodiments, source 106 and encoder system 102 may be physically and/or logically contained within a common box, component, housing or chassis.

Media player 104 is any device, component, module, hardware, software and/or the like capable of receiving a media stream 120 from one or more encoder systems 102. In various embodiments, remote player 104 is personal computer (e.g., a "laptop" or similarly portable computer, although desktop-type computers could also be used), a mobile phone, a personal digital assistant, a personal media player (such as the media player products available from Roku Inc. of Saratoga, Calif.) or the like. In many embodiments, remote player 104 is a general purpose computing device (e.g., a phone, tablet, personal computer, etc.) that includes a media player application 157 in software or firmware that is capable of securely connecting to placeshifting encoder system 102, as described more fully below, and of receiving and presenting media content to the user of the device as appropriate. In other embodiments, however, media player 104 is a standalone or other separate hardware device capable of receiving the media stream 120 via any portion of network 110 and decoding the media stream 120 to provide an output signal 126 that is presented on a television or other display 108. Media players 104 typically include any conventional processors, memory and input/output features found in typical computing systems. Media player 104 may include any sort of storage 117 for caching pre-encoded video 109, as desired. Storage 117 may physically reside in memory or other mass storage present within player device 104.

Network 110 is any digital or other communications network capable of transmitting messages between senders (e.g., encoder system 102) and receivers (e.g., receiver 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

Encoder system 102 is therefore able to communicate with player 104 in any manner (e.g., using any sort of data connections 125 or the like). Such communication may take place over a wide area link that includes the Internet and/or a telephone network, for example; in other embodiments, communications between devices 102 and 104 may take place over one or more wired or wireless local area links that are conceptually incorporated within network 110. In various equivalent embodiments, encoder system 102 and receiver 104 may be directly connected via any sort of wired or wireless link (e.g., an Ethernet cable or the like) with little or no other network functionality provided.

Many different placeshifting scenarios could be formulated based upon available computing and communications resources, consumer demand and/or any other factors. In various embodiments, consumers may wish to placeshift content within a home, office or other structure, such as from a placeshifting encoder system 102 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote player 104 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, any sort of 3G, 4G and/or subsequent telephone link, an IEEE 802.11 "Wi-fi" link, and/or the like). Several examples of placeshifting applications available for various platforms are provided by Sling Media, Inc. of Foster City, Calif., although the concepts described herein could be used in conjunction with products and services available from any source.

Encoder system 102, then, generally creates a media stream 120 that is routable on network 110 based upon content 122 received from media source 106. Expected start locations (e.g., the beginning of the program, the resume point after previous viewing, etc.) of the program can be pre-encoded 109 and cached in storage 107 for immediate use when placeshifting begins (or continues, as appropriate). These pre-encoded portions 109 may be shared with the media player 104 for caching in storage 117 on any temporal basis. In some implementations, the live encoding of media stream 120 may occur simultaneous with transmission of the stream on network 110 at a rate that is faster than the rate at which content is received and/or played back to the viewer, thereby allowing excess content to be cached at media player 104 (e.g., in storage 117 or the like). Storage 117 may therefore be able to store both pre-encoded content 109 and excess live-encoded content as well. In the example shown in FIG. 1, media player 104 suitably provides an interface 151 that includes the rendered media stream, along with user controls 152 to initiate play, pause, fast forward, rewind or other trick play functions.

Interface 151 also includes a buffer indicator 150 that shows the contents of the media stream for the program currently being played back for the user. In this example, a portion 153 of buffer 150 is shaded, indicating that that portion of the encoded media program has been received at the media player 104. The current playback location is indicated by feature 154; in various embodiments, the user may manipulate feature 154 to jump forward or backward in buffer 150 and thereby change the playback location in the rendered program, as desired. If pre-encoded content 109 is cached in storage 117 for the new playback location, then playback can begin immediately from the pre-encoded content 109 without waiting for placeshifting device 102. If pre-encoded content 109 is not cached on the player storage 117, such content may be available from placeshifting device 102 (e.g., from storage 107). If no pre-encoded content 109 is available for the new start point, then encoder 102 will begin live encoding the requested content, albeit with some latency.

Figure 2:
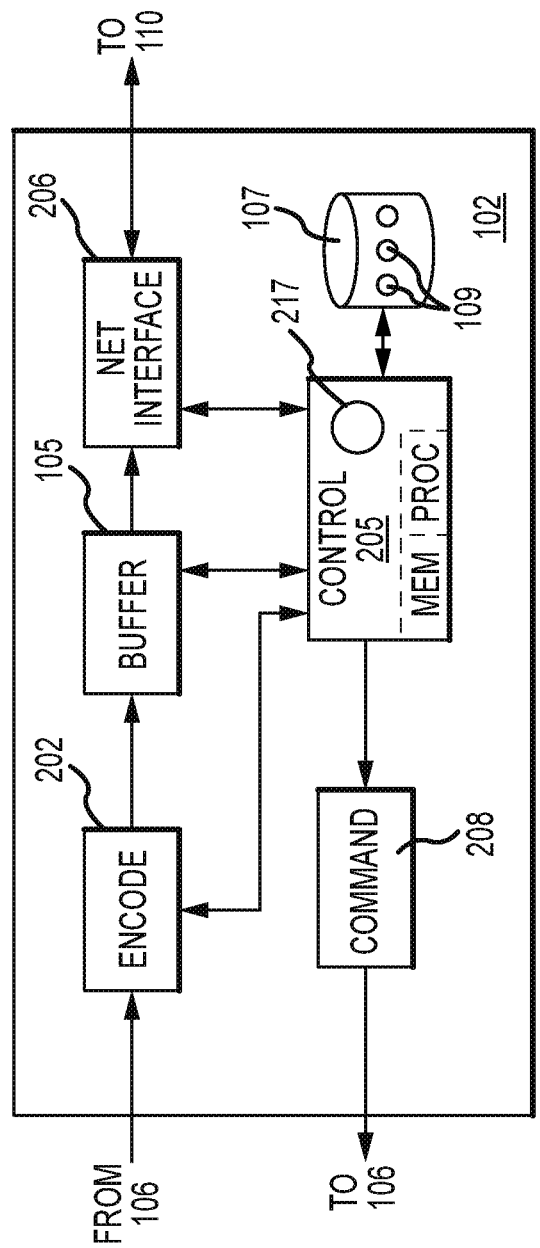
FIG. 2 is a block diagram of an example media live encoding device.

With reference now to FIG. 2, encoder system 102 typically includes an encoder module 202, a buffer 105 and a network interface 206 in conjunction with appropriate control logic 205. In operation, encoder module 202 typically receives media content 122 from an internal or external source 106, encodes the data into the desired format for media stream 120, and stores the encoded data in buffer 105. Network interface 206 then retrieves the formatted data from buffer 105 for transmission on network 110. Control module 205 suitably monitors and controls the encoding and network transmit processes carried out by encoding module 202 and network interface 206, respectively, and may perform other features as well. In the example of FIG. 2, an encoder control application 217 suitably resides as software or firmware in memory or other storage and is executed by control module 205 to control and adapt the encoding of media stream 120 using the techniques described herein. Encoder system 102 may also have a module 208 or other feature capable of generating and providing commands 124 to an external media source 106, as described above.

In the exemplary embodiment shown in FIG. 2, modules 202, 105, 205, 206 and 208 may be implemented in software or firmware residing in any memory, mass storage or other storage medium within encoder system 102 in source code, object code and/or any other format. Such features may be executed on any sort of processor or microcontroller executing within encoder system 102. In various embodiments, encoder system 102 is implemented as a system on a chip (SoC) type system with integrated processing, storage and input/output features. Various SoC hardware implementations are available from Texas Instruments, Conexant Systems, Broadcom Inc., VIXS Inc., NXP/Qualcomm and/or other suppliers as appropriate. Other embodiments may use any number of discrete and/or integrated processing components, memories, input/output features and/or other features as desired.

As noted above, creating a media stream 120 typically involves encoding and/or transcoding an input media stream 122 received from an internal or external media source 106 into a suitable digital format that can be transmitted on network 110. Generally, the media stream 120 is placed into a standard or other known format (e.g., the WINDOWS MEDIA format available from the Microsoft Corporation of Redmond, Wash. although other formats such as the HTTP LIVE STREAMING format, REALPLAYER format, MPEG format, and/or the like could be used in any other embodiments) that can be transmitted on network 110. This encoding may take place, for example, in any sort of encoding module 202 as appropriate. Encoding module 202 may be any sort of hardware (e.g., a digital signal processor or other integrated circuit used for media encoding), software (e.g., software or firmware programming used for media encoding that executes on the SoC or other processor described above), or the like. Encoding module 202 is therefore any feature that receives media data 122 from the internal or external source 106 (e.g., via any sort of hardware and/or software interface) and encodes or transcodes the received data into the desired format for transmission on network 110. Although FIG. 2 shows a single encoding module 202, in practice system 102 may include any number of encoding modules 202. Different encoding modules 202 may be selected based upon preference of player 104, network conditions, and/or the like.

In various embodiments, encoder 202 may also apply other modifications, transforms and/or filters to the received content before or during the transcoding process. Video signals, for example, may be resized, cropped and/or skewed. Similarly, the color, hue and/or saturation of the signal may be altered, and/or noise reduction or other filtering may be applied. Audio signals may be modified by adjusting volume, sampling rate, mono/stereo parameters, noise reduction, multichannel sound parameters and/or the like. Digital rights management encoding and/or decoding may also be applied in some embodiments, and/or other features may be applied as desired.

As initially noted above, system 102 may also include a hard disk drive, memory, or other storage medium 107 to support storage of pre-encoded video 109. Storage 107 may be implemented with any sort of solid state, magnetic, optical or other storage such as a memory, disk or the like. Storage 107 may be the same storage used to support a digital video recorder (DVR) feature or other content source 106 as appropriate.

Figure 3:
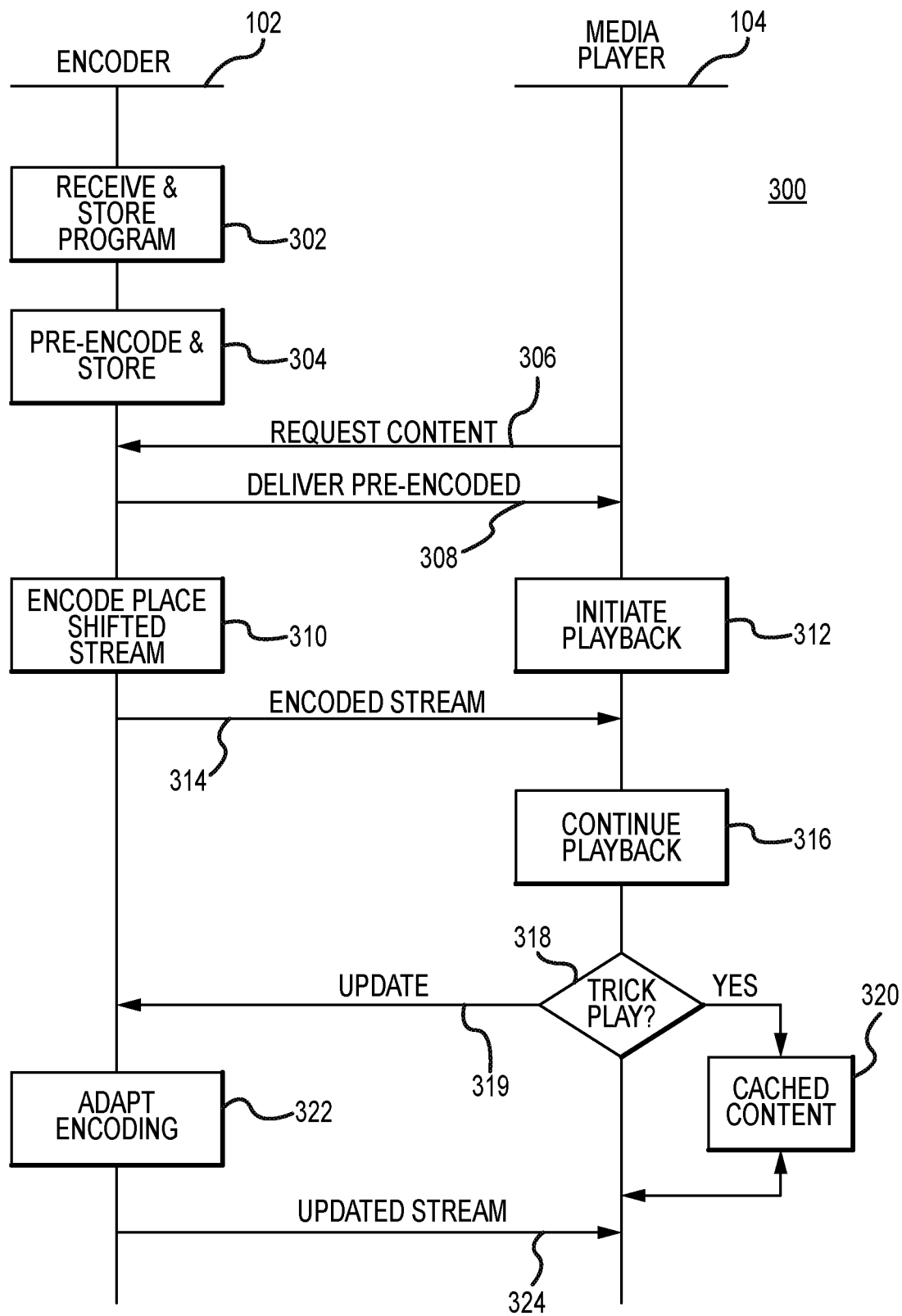
FIG. 3 illustrates an example process to deliver encoded content with reduced latency.

FIG. 3 shows an example process 300 to pre-encode portions of the placeshifted media stream, as desired. The various functions shown in FIG. 3 may be implemented in software, firmware or other programmable logic executing in media player 104 and/or encoder 102, as appropriate. Application 217 of encoder 102, for example, may control the various actions of encode module 202, while application 157 may control the various actions of media player 104. Other embodiments may carry out the various functions of process 300 using different logic or differently-organized logic, as desired.

As shown in FIG. 3, process 300 begins with placeshifting encoder 102 receiving content that may be of future placeshifting interest to a viewer (function 302). Such content may include programs stored in a DVR, for example, or other programs that are available from any content source 106. Programs may be manually selected for future placeshifting by the user in some embodiments, whereas other embodiments will automatically attempt to create pre-encoded start points for some or all of the programs available from content source 106 on an a priori basis as time and resources allow. If an encoder is otherwise idle, for example, the placeshifting device 102 may make use of the idle time to pre-encode as much available content as possible.

Pre-encoding may be performed in any suitable manner (function 304). In various embodiments, pre-encoding involves converting at least some portions of available programs to a streaming format for quick playback. To that end, it may be desirable to pre-encode at least the startup content at a relatively low quality to facilitate rapid transit of network 110, even via limited bandwidth. Lower quality encodings will also conserve space on storage 107, thereby allowing more space for additional pre-encoded content 109, if desired.

Pre-encoding 304 could encode some or all of the program, as appropriate. Starting points are likely to be the highest priority for pre-encoding, since this is the content most likely to be needed. Start points could include the beginning of the program, the next few seconds immediately following a previous viewing that was paused or otherwise interrupted, as well as any likely "skip points" for future trick play. Convenient skip points may include the program points just after commercial breaks, the portions of the program that are just before the most interesting or exciting portions of the program (as determined by supplied excitement data or the like), or any other skip points that are determined in any other manner. Some implementations may further be able to recognize the first few seconds after a commercial break, scene changes, exciting or interesting moments, favorite or most-watched moments, or other portions of the program that are likely to become start points for viewers. Start or skip points may be automatically predicted by encoder 102, in some embodiments, based upon excitement data, viewer information, collected information about particular programs (e.g., viewer behavior during past broadcasts of the same program, crowd-sourced data, data received from other television receivers, etc.), and/or data from any other source. Other embodiments could receive out-of-band data (e.g., data from an electronic program guide or from a separate service 112) that instructs the device 102 as to which points of the particular program should be pre-encoded for best efficiency and effectiveness.

As noted above, some embodiments may pre-encode the entire program content if sufficient time, processing capability and storage capacity is available. This would allow maximum flexibility in providing needed startup content regardless of the user's skipping, scanning or other trick play actions. Pre-encoding 304 may take place prior to placeshifting (or even during live placeshifting) at any time. After a program is recorded in a DVR, for example, various embodiments could pre-encode some or all of the program content so that it is ready for subsequent placeshifting. Pre-encoding may be scheduled according to resource availability, and may be limited by available storage or other resources. Pre-encoded content 109 may be stored at the placeshifting device 102 until it is requested by the media player 102 in some embodiments.

Some implementations could preemptively cache pre-recorded content 109 from one or more programs (e.g., programs stored on a digital video recorder) on the media player 104 at any convenient time (e.g., when placeshifting device 102 and media player 104 are able to directly communicate via a common local area network, and/or during times that one or both devices are otherwise relatively idle, thereby providing time and resources for convenient transfer). While FIG. 3 shows the pre-encoded content stored on the encoder device 102, equivalent embodiments could alternately or additionally forward the pre-encoded content 109 for a priori storage by the media player device 104. This would allow the pre-encoded content to be stored on the media player 102 before the program is even requested by the viewer (function 306), thereby further improving the viewer experience.

Pre-encoding 304 of the future stream of content could take place even after a placeshifting session has begun if sufficient resources are available. That is, if a viewer begins placeshifting a media stream 122, a separate encoder 202 on device 104 could pre-encode later portions of the program (e.g., portions that have not yet been live encoded) while a primary encoder 202 handles the live encoding of the current stream. Since the pre-encoding could be at a lower quality, encoding may occur faster than real time (assuming sufficient source content is available), thereby allowing pre-encoded content to be made available ahead of time even if the viewer skips ahead in the program stream. The primary encoder could catch up as needed to provide better quality through live encoding based upon the current conditions of the network 110.

When the media player 104 requests content for placeshifting (function 306), the placeshifting device 102 suitably provides the pre-encoded content 109 for immediate startup of the media stream (function 308). The pre-encoded content 109 may be delivered in any manner. In various embodiments, the retrieval and delivery of pre-encoded content may be incorporated into the streaming protocol used to deliver media stream 120. Alternately, the pre-encoded contents may be bulk transferred via an in-band or out-of-band connection over network 110 that is included within or separate from the live-encoded video stream. As noted above, the timing of delivery may also vary. Pre-encoded content 109 may be delivered whenever sufficient network capacity and storage space on media player 104 is available. Delivery 308 may therefore occur at any time after the pre-encoding of the content 109, including before or after the placeshifing session 120 is initiated. The particular delivery mechanism and timing will vary from embodiment to embodiment, as appropriate.

After receiving the pre-encoded content 109, the media player 104 is able to immediately initiate playback (function 312) of the pre-encoded content 109 without waiting for the encoder 202 to produce a live encoded stream 314. When the live encoded stream 314 is available, the media player 104 is able to switch from the lower-quality pre-encoded stream to the higher quality live-encoded stream, thereby improving the viewer experience. The pre-encoded content generally provides improved speed and responsiveness. As the program progresses, however, the live-encoded stream will typically provide a better quality that matches the then-current network and computing conditions. Switching from pre-encoded content to live-encoded content therefore provides the benefits of responsiveness at the start of playback while retaining the quality advantages of live encoding for the bulk of the viewing session.

Any additional pre-encoded content 109 cached by the placeshifting device in storage 107 or elsewhere may be delivered as time and resources are available. If sufficient bandwidth is present, pre-encoded content 109 from device 102 may be transferred to player 104 for caching in storage 117 until such time as the content is needed. This transfer can take place in parallel with the live stream, or the content could be transferred out-of-band even prior to the place-shifting session (e.g., during a LAN or cable based synch with the placeshifting device), as desired. Again, content representing some or all of the program can be pre-encoded and cached at the placeshifting device 102 and/or at the media player 104 at any time after the program is made available to the placeshifting device until the relevant content is requested for live encoding.

Live encoding and playback of the live stream can continue (function 316) until the user performs a trick play function such as a fast forward, rewind, skip, seek or the like (function 318). When the user performs a trick play function that results in a new playback point for the media stream, the media player 104 may check to see if it already has pre-encoded content 109 for that playback point (function 330). If cached content 109 is available, then such content can be retrieved from storage 117 and rendered for immediate playback, without waiting for the live-encoded stream.

If the new playback point is not yet available to the media player 104, then the player 104 may request such content from the encoder 102. If encoder 102 has access to pre-encoded content 109 (e.g., if such content was previously stored on storage 107 or the like), then the cached content 109 can be retrieved and delivered to the media player 102 for immediate playback. If pre-cached content is not available, then the encoder will update the encoder 102 (function 319) so that live encoding can continue at the new playback point (function 322). Playback points in the media program may be referenced based upon MPEG presentation time stamps (PTS), or based upon any other temporal reference shared between the player 104 and placeshifting device 102 with respect to the streamed programming. Placeshifting device 102 will then update the encoding point, and provide live encoding for the new program time in an updated stream 324.

In various embodiments, encoder 102 may be able to perform the live encoding of stored programs (e.g., programs from a DVR) at a rate that is faster than real time. Even though this encoding is still "live" in the sense that it is encoded based upon then-current network conditions as the viewer is watching the encoded program, the faster encoding capabilities could allow some future program content to be live encoded and transmitted to the player 104 for caching prior to the playback time, thereby improving the viewer experience. "Live" encoding in this context therefore refers to the time that the content is encoded, which may not necessarily correspond to the playback time.

Player 104 will typically cache this live encoded content in storage 117 or the like for future playback. In such embodiments, player 104 may be able to select between live encoded future content and pre-encoded future content 109 even if the user skips ahead in a program. Typically the player 104 will choose the live encoded content over the pre-encoded content 109 due to the higher quality of most live encoded content, but other embodiments could be programmed to select between live and pre-encoded content in any manner desired.

According to various embodiments, then, a placeshifting device is able to reduce encoder latency by pre-encoding certain portions of the media stream on a priori basis, prior to the beginning of the placeshifting session. By providing pre-encoded content until live encoded content is available, the latency previously experienced during many placeshifting sessions can be significantly reduced, thereby greatly improving the user experience.

Please note that the term "encoding" as used herein is not limited to analog-to-digital conversion, but rather is intended to broadly encompass transcoding or other digital-to-digital conversions. An example embodiment may convert MPEG video content received from a television receiver, DVR or other content source to a digital streaming format, for example. "Encoding" may also encompass conversion from a higher bandwidth digital format (e.g., a format intended for television viewing) to an equivalent lower bandwidth stream of similar format that is more suitably for streaming over a network.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a video encoder device to provide a placeshifted video stream to a media player via a network, the process comprising:
   in response to an instruction from the media player via the network to encode the media program, the video encoder device initiating a live encoding stream of the media program and also pre-encoding only selected portions of the media program to a placeshifting format, wherein at least some of the selected pre-encoded portions of the media program comprise sections of the program immediately following upcoming commercial advertisement breaks in the media program;
   in response to the video encoder device receiving the instruction from the media player to encode the media program, the video encoder device initially providing each of the selected pre-encoded portions of the media program to the media player for storage by the media player to thereby allow the media player to respond to a subsequently-received trick play instruction from a viewer of the media program by immediately rendering of the pre-encoded portion of the media program immediately following the commercial advertisement breaks in the media program from one of the pre-encoded portions previously stored by the media player; and responding to the trick play instruction by adapting the point of live encoding according to then-current network conditions to thereby provide the placeshifted video stream to the media player.

2. The process of claim 1 wherein each of the selected pre-encoded portions encode only the first few seconds of the media program immediately following the commercial advertisements in the media program.

3. The process of claim 1 wherein the selected pre-encoded portions additionally comprise the first few seconds of the media program following a stop point from previous viewing of the media program.

4. The process of claim 1 wherein the selected pre-encoded portions are encoded in a low bandwidth format in comparison to the remaining portions of the media stream.

5. The process of claim 1 wherein each of the selected pre-encoded portions corresponds to a likely start point for playback of the media program.

6. A media encoder device comprising:
a television receiver interface configured to receive broadcasts of television programming;
a network interface to a digital network;
a digital storage configured to record and store at least some of the television programming received via the television receiver interface in a storage format; and
a processor configured:
in response to an instruction from the media player via the network to encode the media program for placeshifting, to initiate a live encoding stream of the media program and also to select and automatically pre-encode only a plurality of portions of at least some of the television programming stored on the digital storage in a placeshifting format that is different from the storage format, wherein at least some of the plurality of pre-encoded portions comprise sections of the television programming immediately following commercial breaks in the television programming;
providing each of the selected pre-encoded portions of the media program to the media player for storage by the media player to thereby allow the media player to respond to a subsequently-received trick play instruction from a viewer of the media program with immediate playback of the pre-encoded portions immediately following the commercial breaks in the television programming from one of the pre-encoded portions previously stored by the media player; and
to respond to the trick play instruction by adapting the point of live encoding according to then-current conditions of the digital network to thereby provide the placeshifted video stream to the remotely-located media player via the digital network.

7. The media encoder device of claim 6 wherein the selected pre-encoded portions additionally comprise the first few seconds of the television programming.

8. The media encoder device of claim 6 wherein the selected pre-encoded portions further comprise the first few seconds of the television programming following a stop point from previous viewing of the television programming.

9. The media encoder device of claim 6 wherein the selected pre-encoded portions are encoded in a low bandwidth format in comparison to the remaining portions of the media stream.

10. The media encoder device of claim 6 wherein all of the selected pre-encoded portions of the television programming are immediately provided to the media player device in response to the media encoder device subsequently receiving the instruction from the remote media player to encode the media program.

11. An automated process performed by a video encoder device to provide a placeshifted video stream to a media player via a network, the process comprising:
in response to an instruction from the media player via the network to encode the media program, initiating a live encoding stream of the media program and, after initiating the live encoding stream, also selecting a plurality of certain portions of the media program and pre-encoding only the selected portions of the media program to a placeshifting format, wherein at least some of the selected pre-encoded portions of the media program comprise sections of the program immediately following the commercial advertisement breaks in the media program;
when the pre-encoding of the selected portions is complete, providing each of the selected pre-encoded portions of the media program to the media player for a priori storage by the media player to thereby allow the media player to respond to a subsequently-received trick play instruction from a viewer of the media program with immediate playback of the pre-encoded portions immediately following one of the commercial breaks in the media program from the pre-encoded portions previously stored by the media player; and
responding to the trick play instruction by adapting the point of live encoding according to then-current network conditions to thereby provide the placeshifted video stream of the media program to the media player.

12. The automated process of claim 11 wherein at least some of the selected pre-encoded portions encode only the first few seconds of the media program immediately following the commercial advertisements in the media program.

\* \* \* \* \*